UNITED STATES PATENT OFFICE.

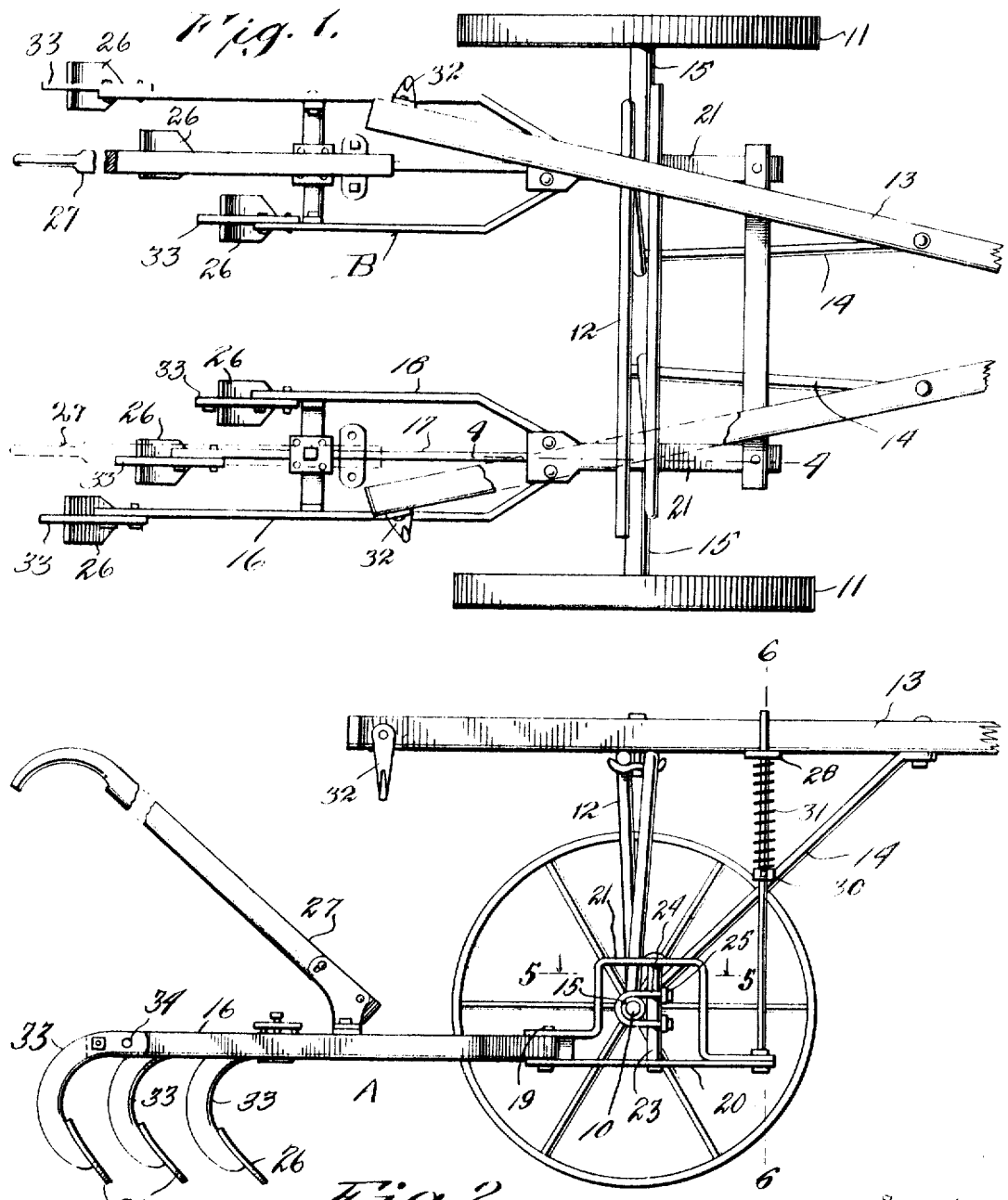

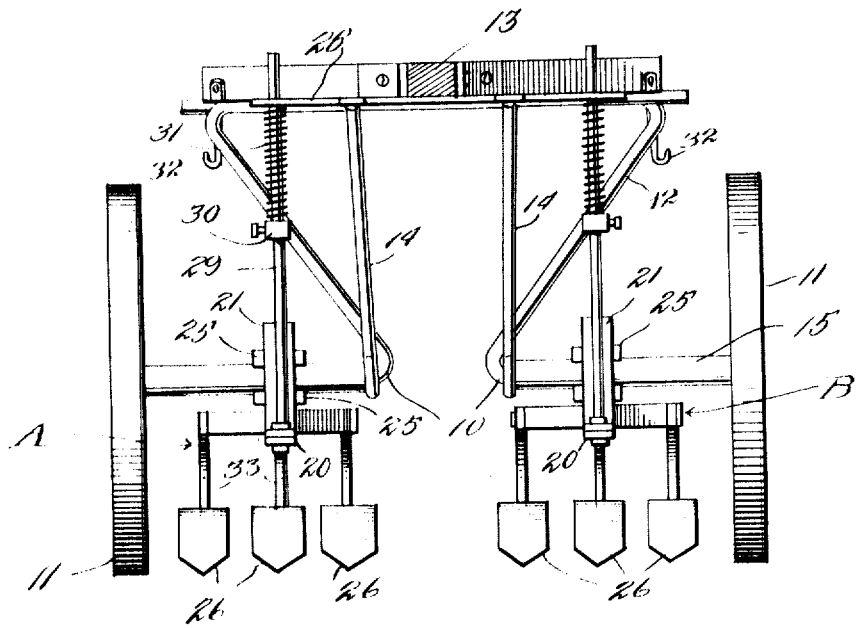

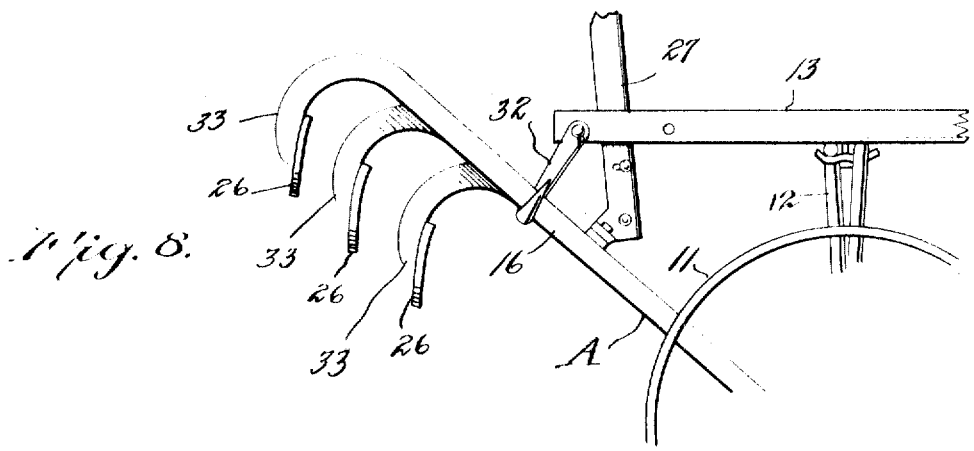
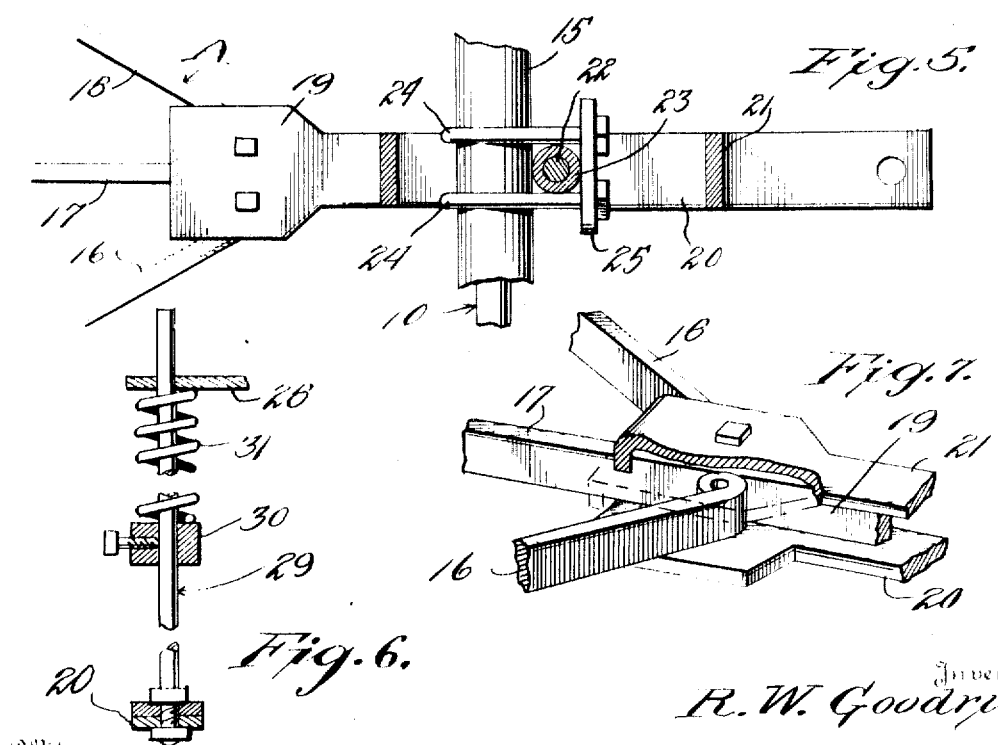

RILLIE W. GOODRICH, OF WAKEFIELD, VIRGINIA.

CULTIVATOR.

1,294,086.   Specification of Letters Patent.   Patented Feb. 11, 1919.

Application filed March 18, 1914. Serial No. 825,663.

*To all whom it may concern:*

Be it known that I, RILLIE W. GOODRICH, a citizen of the United States, residing at Wakefield, in the county of Sussex, State of Virginia, have invented certain new and useful Improvements in Cultivators; and I do hereby declare the following to be a full, clear, and exact description of the invention such as will enable others skilled in the art to which it appertains to make and use the same.

This invention relates to cultivators and particularly that type known as wheel cultivators.

The object of the invention resides in the provision of a cultivator of the type named which embodies an improved construction whereby the beams which support the cultivator blades may be swung in a vertical plane parallel to the longitudinal axis of the cultivator and also adjusted bodily transversely of the cultivator.

A further object of the invention resides in the provision of a cultivator in which the forward ends of the beams which carry the cultivator blades may be adjusted up and down so as to vary the depth of cut of the cultivator blades.

A still further object of the invention resides in provision of means constantly tending to lift the rear ends of the beams which carry the cultivator blades whereby the operator is enabled to lift the rear ends of said beams with less effort.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a double cultivator constructed in accordance with the invention;

Fig. 2, a side elevation of what is shown in Fig. 1 with the near wheel removed;

Fig. 3, a front view of the cultivator;

Fig. 4, an enlarged section on the line 4—4 of Fig. 1;

Fig. 5, a section on the line 5—5 of Fig. 2;

Fig. 6, a section on the line 6—6 of Fig. 2;

Fig. 7, a perspective view of the forward end of one of the beam frames and its associated securing bracket, and Fig. 8, a partial side elevation showing the manner of supporting the free ends of the beam frames in elevated or inoperative position.

Referring to the drawings the improved cultivator is shown as comprising an axle 10 having rotatably mounted on the ends thereof traction wheels 11. Rising from the central portion of the axle 10 is a frame 12 to which is swiveled the rear end of a draft tongue 13, said tongue being strengthened by braces 14 having one end secured to the axle and their other end secured to the tongue. Rotatably mounted on the axle 10 between each wheel 11 and the frame 12 is a sleeve 15 for a purpose that will presently appear.

The cultivator further embodies beam frames A and B and as said frames are identical in construction and similarly connected to the axle 10 only the frame A and its connections with the axle 10 will be described in detail. The frame A is shown as comprising a plurality of beams 16, 17 and 18, the beam 17 being disposed between the beams 16 and 18. The beams 16 and 18 have their forward ends directed toward each other and secured to the beams 17, the forward end of the latter being extended beyond the forward ends of the beams 16 and 18 as at 19. Secured to the underside of the forward end 19 of the beam 17 is a forwardly projecting metallic bar 20 and disposed above this bar 20 in embracing relation to the sleeve 15 is a U-shaped member 21 having the free ends of its arms extended laterally and secured respectively to the upper side of the forward end 19 of the beam 17 and to the forward end of the bar 20. The arm connecting portion of the U-shaped member 21 is connected to the bar 20 by a rod 22 disposed between the forward arm of the U-shaped member and the sleeve 15 and rotatably mounted on this rod is a sleeve 23. The sleeve 23 is detachably secured to the sleeve 15 and of course to the axle 10 by means of U-shaped clips 24 which embrace the sleeve 15 and axle 10 and have their free ends engaged through plates 25 extending transversely of the sleeve 23 and rod 22. By this construction it will be apparent that the rear end of the frame A may be moved up and down owing to the rotatable mounting of the sleeve 15 on the axle 10. It will be further apparent that by releasing the clips 24 the forward end of the frame A can be moved transversely of the cultivator and secured in a desired adjusted position. It will be still further apparent by releasing the clips 24 the forward end of the frame A can be adjusted up and down within certain limits.

Mounted on the beams 16, 17 and 18 are cultivator shovels 26, while a controlling handle 27 is secured to the beam 17. Mounted on the tongue 13 transversely of the latter and forward of the frame 12 is a plate 28 in which is slidably mounted one end of a vertical rod 29, the lower end of said rod being rigidly secured to the bar 20 and the laterally directed free end of the forward arm by the U-shaped member 21. Adjustably mounted on the rod 29 is a collar 30 and encircling said rod is a spring 31 one end of which bears against the collar 30 and the other end against the plate 28. The tension of this spring constantly tends to elevate the rear end of the frame A and constitutes an aid to the operator when it is necessary to raise the rear end of the frame A in the operation of the machine. Secured to the rear end of the tongue 13 are hook elements 32 which are adapted to be engaged with respective handles 27 to support the rear ends of the frames A and B elevated when the cultivator is not in use or when it is desired to move same from one locality to another. The shovels 26 are secured to standards 33 which latter are in turn connected to respective beams of the frames A and B by bolts 34 which are adapted to break under a predetermined strain so as to obviate the possibility of damage to the shovel and its standards.

What is claimed is:—

1. In a cultivator, the combination with an axle, of a horizontal sleeve rotatably mounted upon the axle, a vertical sleeve connected with the horizontal sleeve for both vertical and horizontal adjustment, a bolt engaged through the vertical sleeve, plates engaged with the bolt above and below the vertical sleeve, one of said plates having a U-shaped portion surrounding the axle, cultivating elements connected with the plates at one side of the axle, said plates extending at the opposite side of the axle horizontally and in mutual engagement with each other, and means for balancing the cultivating elements, said balancing means being connected with the last mentioned portions of the plates.

2. In a cultivator, the combination with an arched axle having horizontal spindles, of sleeves rotatably mounted upon the spindles, drag frames rearwardly of the axle, bars fixed to the forward ends of the frames and extended beneath the sleeves, inverted U-shaped members bridging the sleeves and fixed to the bars and frames respectively, vertical pivots supported within the members and fixed in said bars, sleeves rotatably supported on the pivots, clips embracing the sleeves on the horizontal spindles and arranged at opposite sides of the sleeves on the pivots and plates, and plates disposed cross-wise of the sleeves on the pivots and engaged by the clips.

In testimony whereof, I affix my signature, in the presence of two witnesses.

RILLIE W. GOODRICH.

Witnesses:
J. J. CLARY,
E. J. SINCLAIR.